Patented Mar. 12, 1935

1,994,136

UNITED STATES PATENT OFFICE 1,994,136

DYESTUFFS OF THE DIBENZANTHRONE SERIES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application January 22, 1932, Serial No. 588,231. In Germany June 9, 1927

2 Claims. (Cl. 260—61)

The present invention relates to new dyestuffs of the dibenzanthrone series and process of producing same and is a continuation-in-part of our copending application Ser. No. 246,078, filed January 11, 1928.

We have found that valuable vat dyestuffs are obtained by condensing a dibenzanthrone which term is meant to include also isodibenzanthrones, containing from 2 to 6 halogen atoms, with an aminoanthraquinone or a derivative thereof. The condensation is brought about by heating the components together in the presence of copper or a compound thereof and an acid-binding agent. Copper compounds which may be used, are, for example, copper salts, such as carbonate, acetate, oxalate, sulphate, nitrate and halides, cupric and cuprous oxides. As acid-binding agents may be mentioned the alkali and alkaline earth metal salts of weak acids, for example carbonic, acetic, oxalic acid, secondary and tertiary phosphates of alkali metals, calcium and magnesium oxides, dimethylaniline, quinoline and the like. The condensation is preferably carried out in inert organic solvents, in particular aromatic solvents of high boiling point, such as nitro derivatives of benzene and its homologues, naphthalene, quinoline and dimethylaniline. Aminoanthraquinones which may be used for the preparation of the dyestuffs, are for example, mono- and poly-amino derivatives of anthraquinone itself, its homologues and their substitution products and derivatives in which the two keto groups are unaltered, for example such as are substituted by simple substituents such as hydroxy, alkoxy, cyano, alkylamino, aryl-amino including anthraquinonyl amino and aldehyde groups or by an attached nuclear system as in the case of amino derivatives of anthrimidecarbazoles (diphthaloyl carbazole), anthraquinone-acridones, -thioxanthones, -oxazoles and -imidazoles.

The new dyestuffs are obtained in very good yields according to the process described and mostly in a pure state. If necessary, they may be purified by recrystallization from organic solvents, by reprecipitation from their solutions in concentrated sulphuric acid, or by treating their aqueous pastes with an oxidizing agent, for example an alkali metal hypochlorite solution. The dyestuffs form dark powders dissolving in concentrated sulphuric acid to give violet or green solutions and dye the vegetable fiber usually violet, dark blue to olive and grey shades from usually blue to brown violet vats.

The following examples will further illustrate the nature of this invention but the invention is not limited to these examples. The parts are by weight.

Example 1

12.5 parts of dibromodibenzanthrone (prepared by brominating dibenzanthrone in chlorosulphonic acid in the presence of sulphur) are boiled for 13 hours, while stirring, in a mixture of 250 parts of nitrobenzene, 2.5 parts of copper carbonate, 10 parts of sodium carbonate and 10 parts of 1-aminoanthraquinone; the reaction product is filtered off by suction, while hot, and is then boiled with water and dilute acid for removing inorganic constituents, and dried after filtration. The black powder obtained gives a blue solution with concentrated sulphuric acid and grey to blue-black dyeings of excellent fastness on cotton from a blue vat.

Example 2

11 parts of dichloro-dibenzanthrone (obtainable by chlorinating dibenzanthrone in chlorosulphonic acid in the presence of sulphur) are suspended in 100 parts of nitrobenzene; 5 parts of sodium acetate, 1.5 parts of copper carbonate and 5 parts of 1.4-amino-methoxyanthraquinone are added and the mixture is boiled for 20 hours while stirring. The reaction product is filtered off by suction while hot and worked up as described in Example 1. The black powder so obtained dyes cotton from a green-blue vat blue-grey to blue-black shades of excellent fastness and dissolves to a blue solution in concentrated sulphuric acid.

Example 3

62 parts of dibromo-isodibenzanthrone obtainable by brominating isodibenzanthrone in nitrobenzene are boiled for 15 hours while stirring in a mixture of 1000 parts of nitrobenzene, 30 parts of sodium acetate, 2 parts of copper carbonate, 5 parts of cupric oxide and 50 parts of 1.4-amino-methoxyanthraquinone. The reaction product is filtered off by suction while hot and worked up as described in Example 1. The grey-black powder obtained dyes cotton violet-grey shades of excellent fastness from a green-blue vat and gives blue solutions in concentrated sulphuric acid.

Example 4

63 parts of penta-chlorodibenzanthrone (obtainable by chlorinating dibenzanthrone in nitrobenzene) are heated to boiling for from 10 to 15 hours, while stirring, in 1000 parts of naphthalene after the addition of 100 parts of potassium carbonate, 10 parts of copper oxide and 140 parts of 1-amino-4-benzoylaminoanthraquinone, the precipitate being filtered off from the hot reaction mixture. The filter cake is then freed from nitrobenzene by means of steam and worked up in the usual manner. The reaction product thus obtained is a black powder dissolving in concentrated sulphuric acid to give violet solutions and dyes cotton grey shades of a particular fastness against washing from a brown violet vat.

Instead of 1-amino-4-benzoylaminoanthraquinone equivalent amounts of 1,4-diaminoanthraquinone, 1-amino-5-benzoylaminoanthraquinone, 1-amino-8-benzoylaminoanthraquinone, 1-amino-5-benzoylamino-8-methoxyanthraquinone or amino-acylaminoanthraquinones substituted in the acid radical may be used for the condensation, whereby products are obtained which, generally speaking, dye cotton grey to dark blue shades.

The condensation product of penta-chloroisodibenzanthrone (obtainable by heating isodibenzanthrone in trichlorobenzene with ferric chloride) and α-aminoanthraquinone yield likewise grey shades on cotton.

In an analogous manner from di-, tri- and tetra-halogendibenzanthrones by condensation with from 2 to 4 equivalent amounts of α-aminobenzoylaminoanthraquinone products are obtained dyeing cotton from violet-brown to blue vats violet, dark blue to grey shades.

Example 5

62 parts of dibromoisodibenzanthrone are heated to boiling, while stirring, in 500 parts of nitrobenzene with 46 parts of β-aminoanthraquinone, after the addition of 25 parts of sodium acetate and 7 parts of copper carbonate until the reaction product is practically free from bromine. The reaction mixture is then allowed to cool and worked up in the usual manner. The condensation product thus obtained is a blue-black powder dissolving in concentrated sulphuric acid to give an olive-green solution and dyes cotton strong navy-blue shades from a blue vat.

Strong violet shades of very good fastness are obtained on cotton by the condensation product of 1 molecular proportion of 6,6'-dichloroisodibenzanthrone and 2 molecular proportions of α-aminoanthraquinone.

Example 6

70 parts of tribromodibenzanthrone are heated to boiling, while stirring, in 1000 parts of nitrobenzene after the addition of 75 parts of 1-aminoanthraquinone-2-aldehyde, 50 parts of calcined soda and 5 parts of copper oxide until the reaction product is practically free from bromine. The reaction mixture is then allowed to cool and worked up as usual. The reaction product obtained in the form of a blue-black powder dissolves in concentrated sulphuric acid to give a violet solution and dyes cotton from a violet-grey vat strong grey shades of very good fastness.

A product having similar properties is obtained by replacing the 75 parts of 1-aminoanthraquinone-2-aldehyde by 69 parts of α-aminoanthraquinone.

Example 7

62 parts of dibromodibenzanthrone are heated to boiling in 1000 parts of nitrobenzene with 84 parts of 4-amino-3',5'-dichloroanthraquinone-2,1-(N)-benzacridone after the addition of 50 parts of sodium acetate and 75 parts of copper oxide until the reaction product is practically free from bromide. After cooling the reaction mixture is worked up in the usual manner. The condensation product thus obtained is a green-black powder dissolving in concentrated sulphuric acid to give a violet solution and dyes the vegetable fiber strong olive shades from a violet vat.

The reaction product obtained in an analogous manner from dibromo- or dichloroisodibenzanthrone dyes dark blue shades.

By condensation of 1 molecular proportion of dichlorodibromodibenzanthrone with 4 molecular proportions of 4-amino-5'-benzoylamino-8-methoxy-1,1'-dianthrimidecarbazole a reaction product is obtained dyeing from grey to black shades.

Example 8

78 parts of tetrabromoisodibenzanthrone are heated to boiling, while stirring, in 1000 parts of nitrobenzene with 200 parts of 4'-amino-1'-Bz1-benzanthrone-aminoanthraquinone (obtainable by condensation of Bz1-bromobenzanthrone with 1-amino-4-benzoylaminoanthraquinone, fusing the condensation product with caustic potash thereby saponifying the reaction product), after the addition of 100 parts of sodium acetate and 3 parts of copper oxide until the reaction product is practically free from bromine. The reaction mixture is then worked up in the usual manner. The condensation product thus obtained is a blue-black powder and dyes cotton very fast dark blue shades from a blue vat.

What we claim is:

1. Vat dyestuffs corresponding to the general formula:

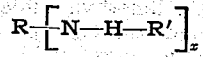

wherein R stands for a dibenzanthrone radical, R' stands for a radical of an anthraquinone attached in its alpha position to the nitrogen atom and containing a benzoylamino group and X is any member from 2 to 5 which dyestuffs dissolve in concentrated sulphuric acid to give blue to violet or green solutions and usually dye the vegetable fiber from blue to brown violet vats violet, dark blue to olive and grey shades.

2. The vat dyestuff corresponding to the formula:

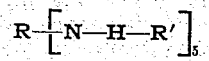

wherein R stands for dibenzanthrone and R' stands for 5-benzoylaminoanthraquinone attached in its alpha position to the nitrogen atom, which dyestuff dissolves in concentrated sulphuric acid to give a violet solution and dyes cotton from a brown-violet vat grey shades.

MAX ALBERT KUNZ.
KARL KOEBERLE.